(12) United States Patent
Brees et al.

(10) Patent No.: US 7,770,707 B2
(45) Date of Patent: Aug. 10, 2010

(54) AXIALLY ENGAGING AND DISENGAGING ONE-WAY CLUTCH AND A STATOR HAVING AN AXIALLY ENGAGING AND DISENGAGING ONE-WAY CLUTCH

(75) Inventors: William Brees, Wooster, OH (US); Jeffrey Hemphill, Copley, OH (US); Joachim Hoffmann, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 431 days.

(21) Appl. No.: 11/480,815

(22) Filed: Jul. 3, 2006

(65) Prior Publication Data

US 2007/0045076 A1 Mar. 1, 2007

Related U.S. Application Data

(60) Provisional application No. 60/710,828, filed on Aug. 24, 2005.

(51) Int. Cl.
*F16D 41/00* (2006.01)
(52) U.S. Cl. .................. 192/46; 192/69.71; 60/345
(58) Field of Classification Search ............. 192/69.71, 192/46; 60/345; 188/82.74; 464/38
See application file for complete search history.

(56) References Cited

U.S. PATENT DOCUMENTS

| 2,571,669 | A | * | 10/1951 | Boyce et al. ................ 56/253 |
|---|---|---|---|---|
| 3,148,499 | A | * | 9/1964 | Tringali ...................... 368/60 |
| 3,710,906 | A | * | 1/1973 | Setele ......................... 192/46 |
| 3,838,567 | A | * | 10/1974 | Giger et al. ................. 368/208 |
| 4,131,039 | A | * | 12/1978 | Garconnet .................... 81/475 |
| 5,678,668 | A | * | 10/1997 | Sink ............................ 192/46 |
| 5,718,114 | A |   | 2/1998 | Murata et al. |
| 5,829,565 | A | * | 11/1998 | Fergle et al. ................. 192/46 |
| 5,852,932 | A |   | 12/1998 | Matsumoto |
| 5,871,071 | A | * | 2/1999 | Sink ............................ 192/46 |
| 5,918,461 | A | * | 7/1999 | Bacon ......................... 60/343 |
| 2001/0027649 | A1 | | 10/2001 | Reinhart et al. |

FOREIGN PATENT DOCUMENTS

| DE | 19532923 A1 | 3/1966 |
|---|---|---|
| DE | 3241053 A1 | 5/1984 |
| EP | 0525126 B1 | 9/1996 |
| EP | 0811788 B1 | 4/2001 |

* cited by examiner

*Primary Examiner*—Richard M. Lorence
(74) *Attorney, Agent, or Firm*—Simpson & Simpson, PLLC (57) ABSTRACT

The present invention broadly comprises a stator for a torque converter with first and second plates. The first plate is connected to a rim for the stator and includes at least one first opening. The second plate is connected to the a hub for the stator and includes at least one first protrusion lockingly engageable with the at least one first opening. The first plate is rotatable about an axis for the hub and the at least one first protrusion and the at least one first opening are lockingly engageable when the first plate is rotated in a first direction with respect to the axis. The at least one first protrusion and the at least one first opening are slidingly engageable when the first plate is rotated in a second direction opposite the first direction.

25 Claims, 6 Drawing Sheets

AXIALLY ENGAGING AND DISENGAGING ONE-WAY CLUTCH AND A STATOR HAVING AN AXIALLY ENGAGING AND DISENGAGING ONE-WAY CLUTCH

This application claims the benefit under 35 U.S.C. §119(e) of U.S. Provisional Application No. 60/710,828, filed Aug. 24, 2005.

FIELD OF THE INVENTION

The invention relates to an axially engaging and disengaging one-way clutch. In particular, the invention relates to a stator having an axially engaging and disengaging one-way clutch mechanism for a torque converter.

BACKGROUND OF THE INVENTION

Torque converters are frequently used in motor vehicles to transmit the torque from the engine to the transmission. A torque converter typically comprises three main components, namely, an impeller, a turbine wheel and a stator, which is supported between the impeller and turbine wheel. All parts are housed in a converter housing that is filled with hydraulic fluid.

The stator comprises a stator rim, which supports guide blades, and a one-way clutch typically mounted on the inner circumference of the stator rim. In general, the one-way clutch has an outer freewheel ring, which is rotationally fixedly joined to the stator rim, an inner freewheel ring, which rests in a rotationally fixed manner on a stator shaft that is attached to the transmission, and a one-way clutch mechanism disposed between them. The one-way clutch permits a rotation of the stator in relation to the stator shaft in only one relative direction of rotation and blocks it in the other direction of rotation.

One-way clutch mechanisms, such as ratchet freewheels (European Patent 0 525 126 B1), roller-type freewheels (German Patents 32 41 053 A1 and 195 32 923 C2) or sprag freewheels (European Patent 0 811 788 B1) are known. Unfortunately, these clutch mechanisms must be made of a plurality of separate elements, requiring a high level of manufacturing and assembly effort. Thus, for example, numerous spring-mounted jamming rollers are inserted in a roller-type freewheel between the two freewheel rings in pockets of the outer ring. The respective spring presses the jamming roller into contact with a grip roller associated therewith. Depending on the direction of rotation, the outer ring may be rotated relative to the inner ring or be blocked in a wedgelike manner.

German Patent Application 100 17 744 A1 (US 2001/0027649 A1) discloses a freewheel for a stator of a hydrodynamic torque converter including a blocking element carrier extending in the circumferential direction and formed from an element in the shape of a ring wheel. First and second blocking elements are bent out from the ring wheel in opposing axial directions and opposing circumferential directions. In a corresponding manner, the solid freewheel inner element and the solid freewheel outer element have sections situated opposite each other in which axially open recesses are formed using embossing techniques.

The axially protruding locking elements of the locking element carrier axially engage in these recesses. In addition, a plurality of indentations are formed on the perimeter of the locking element carrier, in which the freewheel inner element engages with assigned radially inward gripping clutch projections in order to obtain a rotationally fixed coupling between the locking element carrier and the freewheel inner element. The locking surfaces are oriented opposite each other so that they are exposed in opposing circumferential directions in order to cooperate with the locking elements assigned to each. In order to be able to support the axial shear forces on the stator primarily in the locking mode for the freewheel, an additional axial support element acting between the two elements may be provided. Unfortunately, the freewheel elements must be placed on the periphery of the stator, which may not be desirable in all cases.

BRIEF SUMMARY OF THE INVENTION

The present invention broadly comprises a one-way clutch for an automotive component, including: a first plate radially disposed about an axis for the component and rotationally connected to a rotating element of the component and a second plate radially disposed about the axis. The first plate includes one of a first opening and a first protrusion. The second plate includes the other of the first opening and the first protrusion and the first opening and the first protrusion are lockingly engageable. The first plate is rotatable about the axis in a first direction and the first protrusion and the first opening are lockingly engageable when the first plate is rotated faster than the second plate in the first direction. In some aspects, the second plate is rotatable about the axis in the first direction or the second plate is non-rotatable about the axis. The first protrusion and the first opening are slidingly engageable when the first plate is rotating in a second direction, opposite the first direction, relative to the second plate. In some aspects, the second plate is non-rotatable about the axis.

In some aspects, the clutch includes an intermediate plate axially disposed between the first and second plates. In response to the first plate rotating in the second direction relative to the second plate, the intermediate plate and the first protrusion are engageable and the intermediate plate prevents the first protrusion from engaging the first opening. In some aspects, the intermediate plate includes a second opening and wherein the first opening and the second opening are alignable. In some aspects, the at least one first protrusion includes a tab engageable with one of the first or second plates when the intermediate plate is rotated in the second direction. In some aspects, at least one of the first plate, the second plate, or the intermediate plate is a stamped part.

In some aspects, the clutch includes a biasing element in contact with the second plate, the second plate is axially displaceable, and the biasing element urges the second plate toward the first plate along the axis. In some aspects, the biasing element is a spring or the second plate is inherently elastic and in contact with the first plate.

In some aspects, the clutch includes a third plate radially disposed about the axis and rotationally connected to the rotating element and a fourth plate radially disposed about the axis. The third plate includes one of a second opening and a second protrusion, the fourth plate includes the other of the second opening and the second protrusion, and the second opening and the second protrusion lockingly engageable.

In some aspects, the clutch includes at least one track disposed between the first and second plates and at least one element disposed in the at least one track and in contact with the first and second plates. The second plate is axially displaceable with respect to the first plate responsive to movement of the element in the track, the first opening and the first protrusion are engageable responsive to the movement, and the element is moveable in response to rotation of the first plate with respect to the second plate. In some aspects, the element is a sphere. In some aspects, the automotive component is selected from the group consisting of a stator for a torque converter, a torque converter, an actuator mechanism, an accessory drive, and a transmission The present invention also broadly comprises a one-way clutch for a stator for a torque converter, including a first plate radially disposed about an axis for the stator and rotationally connected to a rim for the stator and a second plate radially disposed about the axis and rotationally connected to a hub for the stator. The first plate includes one of a first opening and a first protrusion. The second plate includes the other of the first opening and the first protrusion, the first protrusion and the first opening are lockingly engageable when the first plate is rotating in a first direction, and the first protrusion and the first opening are slidingly engageable when the first plate is rotating in a second direction, opposite the first direction. In some aspects, the stator includes an intermediate plate axially disposed between the first and second plates. In response to the first plate rotating in the second direction, the intermediate plate and the first protrusion are engageable and the intermediate plate prevents the first protrusion from engaging the first opening. In some aspects, at least one of the first plate, the second plate or the intermediate plate is a stamped part. In some aspects, the clutch includes a biasing element in contact with the second plate, the second plate is axially displaceable, and the biasing element urges the second plate toward the first plate along the axis. In some aspects, the stator includes at least one track disposed between the first and second plates and at least one element disposed in the at least one track and in contact with the first and second plates. The element is moveable in response to rotation of the first plate with respect to the second plate, the second plate is axially displaceable with respect to the first plate responsive to the movement, and the first opening and the first protrusion are engageable responsive to the movement.

The present invention further broadly comprises a one-way clutch for a stator for a torque converter, including: a first stamped plate radially disposed about an axis for the stator, rotationally connected to a rim for the stator, and including a first opening; a second stamped plate rotationally connected to a hub for the stator and including a first protrusion; a biasing element in contact with the second plate; and an intermediate plate axially disposed between the first and second plates. The first protrusion and the first opening are lockingly engageable when the first plate is rotated in a first direction and the first protrusion and the first opening are slidingly engageable when the first plate is rotating in a second direction, opposite the first direction. In response to the first plate rotating in the second direction, the intermediate plate and the first protrusion are engageable and the intermediate plate prevents the first protrusion from engaging the first opening. The second plate is axially displaceable and the biasing element urges the second plate toward the first plate along the axis.

The invention also comprises a method for freewheeling in a stator for a torque converter.

One object of the present invention is to simply the design for a freewheel in a torque converter stator.

Another object of the present invention is reduce production costs for a freewheel in a torque converter stator.

Still another object of the present invention is to reduce the weight associated with a freewheel in a stator.

Yet another object of the present invention is to reduce parts wear during freewheel operation.

These and other objects and advantages of the present invention will be readily appreciable from the following description of preferred embodiments of the invention and from the accompanying drawings and claims.

BRIEF DESCRIPTION OF THE DRAWINGS

The invention is explained in detail below in reference to an exemplary embodiment. In the accompanying drawings.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
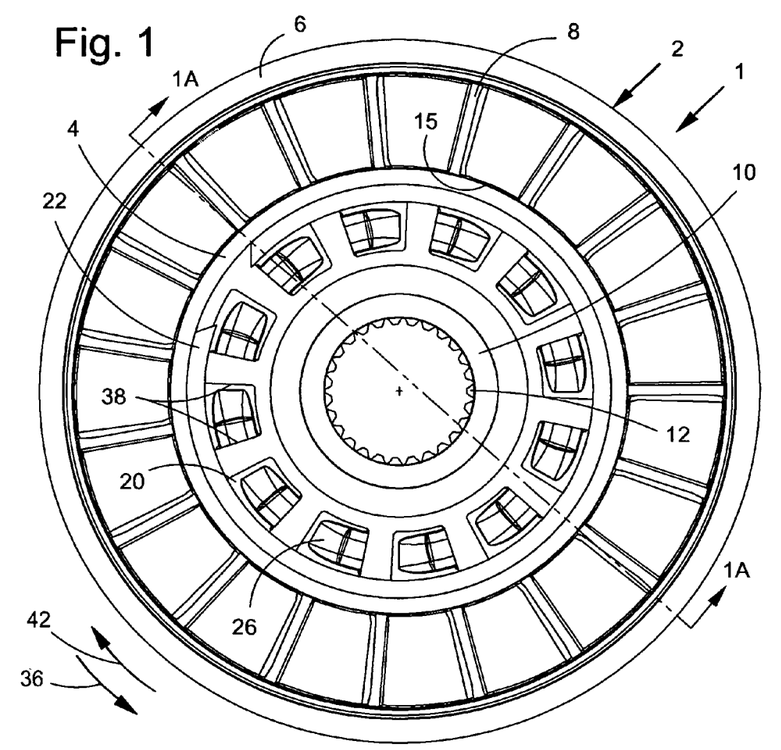
FIG. 1 is a plan view of a present invention stator with a single clutch mechanism.

FIG. 1 is a plan view of a present stator with a single clutch mechanism.

Figures 1A, 1B:
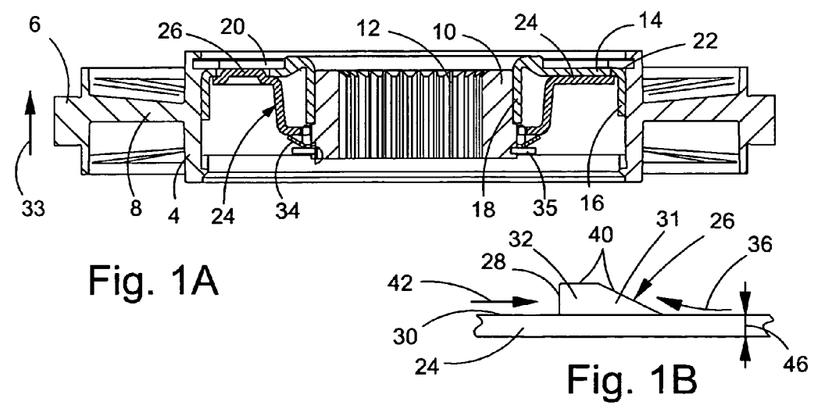
FIG. 1A is a cross-sectional view of the stator in FIG. 1 along line 1A-1A in FIG. 1.
FIG. 1B is a cross-sectional view of a typical ramp for a present invention stator.

FIG. 1A is a cross-sectional view of the stator in FIG. 1 along line 1A-1A. The following should be viewed in light of FIGS. 1 and 1A. Stator 1 includes stator rim 2 having an integrally formed inner stator ring 4, integrally formed outer stator ring 6, and guide blades 8 disposed between inner stator ring 4 and outer stator ring 6. The rim, ring, and blades can be made of any material known in the art, for example, die-cast aluminum. Stator hub 10 includes multi-tooth spline 12 engaged with a stator shaft (not shown) of a transmission (not shown). In some aspects, stator hub 10 is solid and can be made of any material known in the art, for example, stainless steel or unbreakable plastic. Cylindrical ratchet disk 14 is positioned inside inner circumference 15 of inner stator ring 4 and outer casing 16 of disk 14 and is attached to ring 4 by any means known in the art. Disk 14 is radially disposed about a longitudinal axis (not shown) for stator 1. Alternately stated, disk 14 is substantially orthogonal to the axis. Disk 14 is rotationally fixed with respect to rim 2. Inner casing 18 of cylindrical ratchet disk 14 centers and guides stator hub 10. Stator rim 2 forms a solid ring base for holding stator hub 10 in the area of inner stator ring 4. Ratchet disk 14 includes at least one window 20. In some aspects, windows 20 are evenly spaced. Snap ring 22 in inner stator ring 4 holds ratchet disk 14 in the stator. Locking disk 24 is disposed between inner stator ring 4 and stator hub 10. Locking disk 24 is rotationally fixed, but axially displaceable with respect to hub 10. In some aspects disk 24 is pot-shaped. Disk 24 is radially disposed about the longitudinal axis for stator 1. Alternately stated, disk 24 is substantially orthogonal to the axis.

FIG. 1B is a cross-sectional view of a typical ramp for a present invention stator. FIG. 1B is not to scale. The following should be viewed in light of FIGS. 1, 1A, and 1B. Locking disk 24 includes ramps, or protrusions, 26 aligned to face windows 20. In general, ramps 26 correspond in number to windows 20. Ramps 26 are configured to form a surface 28, typically orthogonal with surface 30. FIG. 1B is meant to show the general features of the ramps, for example, inclined area 31 and flattened area 32 and does not show details such as bevels. It should be understood that other configurations of ramp 26 are within the spirit and scope of the claims.

Locking disk 24 is configured so that the disc is urged in direction 33. In some aspects, the locking disc is intrinsically elastic. In some aspects, cup spring 34 applies force to disk 24. Cup spring 34 is positioned on stator hub 10 and is secured using snap ring 35. The urging of ramps 26 in direction 33 causes the ramps to engage windows 20. In some aspects, stator rim 2 and hub 10 are cast parts; ratchet disk 14 and locking disk 24 are simple stamped bent parts; and cup springs 34 and snap rings 22 and 35 are standard parts, thereby reducing the cost of producing stator 1.

The function of the present invention is briefly explained below. In a freewheel mode, rim 2 and disk 14 rotate in direction 36. Hub 10 and disk 24 do not rotate due to the connection of hub 10 to the shaft. Windows 20 slidingly engage ramps 26 in the freewheel mode. That is, edges 38 ride along surface 30, engage ramps 26 at surface 40 and drop down to surface 30 again at surface 28 (it should be noted that disk 14 is fixed axially and disk 24 is axially displaceable). Thus, rim 2 is able to freewheel with respect to hub 10. That is, the rim rotates independently of the hub. As a result, stator 1 can run freely as torque is transmitted to stator rim 2 via blades 8 in direction 36.

In a locking mode, rim 2 and disk 14 rotate in direction 42. As noted above, hub 10 and disk 24 do not rotate. As disk 14 rotates, edges 38 lockingly engage ramps 26. That is, the edges ride along surface 30 and engage edge 28. Since disk 24 is being urged in direction 33, surface 30 presses against disk 14 and the disk is unable to move past edge 28. Thus, in this direction of rotation, stator rim 2 and stator hub 10 can no longer freewheel relative to each other. That is, rim 2 is rotationally locked with hub 10. Stator rim 2 locks because stator hub 10 is fixedly attached to the stator shaft of a vehicle transmission. It should be understood that directions 36 and 42 and the configuration of ramps 26 may be reversed and that this variation is applicable to each of the aspects of the present invention.

In some aspects (not shown), ratchet disk 14 is rotationally fixed with respect to stator hub 10 and locking disk 24 is rotationally fixed with respect to inner stator ring 4. It should be understood that this general configuration is applicable to other aspects of the present invention.

Figure 2:
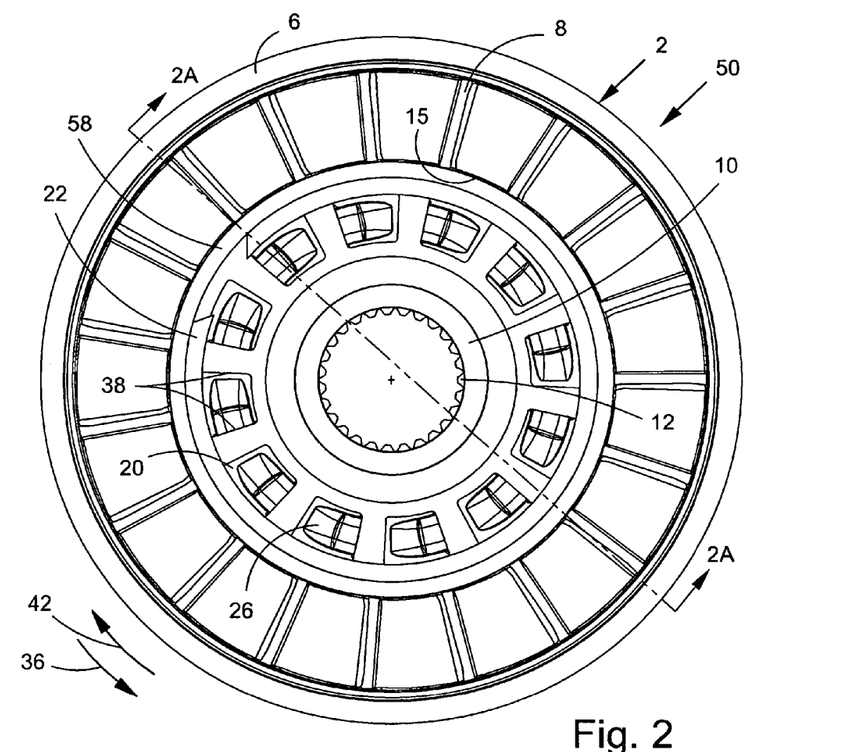
FIG. 2 is a plan view of a present invention stator with two clutch mechanisms.

FIG. 2 is a plan view of present invention stator 50 with two clutch mechanisms.

Figure 2A:
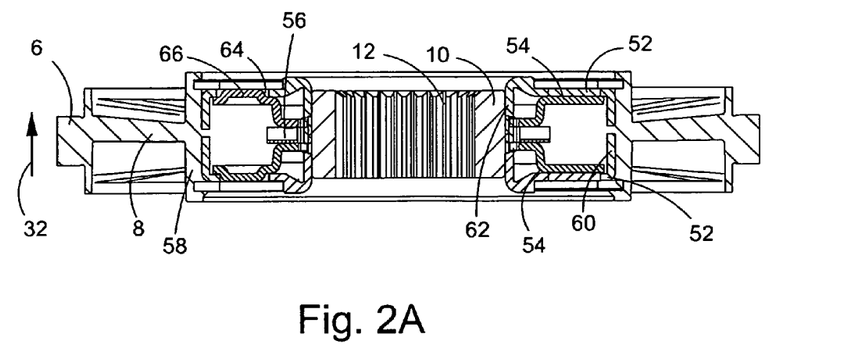
FIG. 2A is a cross-sectional view of the stator in FIG. 2 along line 2A-2A in FIG. 2.

FIG. 2A is a cross-sectional view of stator 50 along line 2A-2A in FIG. 2. The following should be viewed in light of FIGS. 2 and 2A. Stator 50 is substantially the same as the stator shown in FIGS. 1 and 1A, except stator 50 includes ratchet disks 52 and locking disks 54 in mirror symmetry. In some aspects, centrally mounted undulated spring 56 provides for the suspension of locking disks 54. However, it should be understood that any means known in the art can be used to bias the disks. Outer casing 60, inner casing 62, windows 64, and ramps 66 substantially correspond to outer casing 16, inner casing 18, windows 20, and ramps 26 in FIG. 1.

In some aspects (not shown), ratchet disks 52 are not separate, but instead are formed from a single piece.

In some aspects (not shown), ratchet disks 52 are rotationally fixed with respect to stator hub 10 and locking disks 54 are rotationally fixed with respect to inner stator ring 58.

Figure 3:
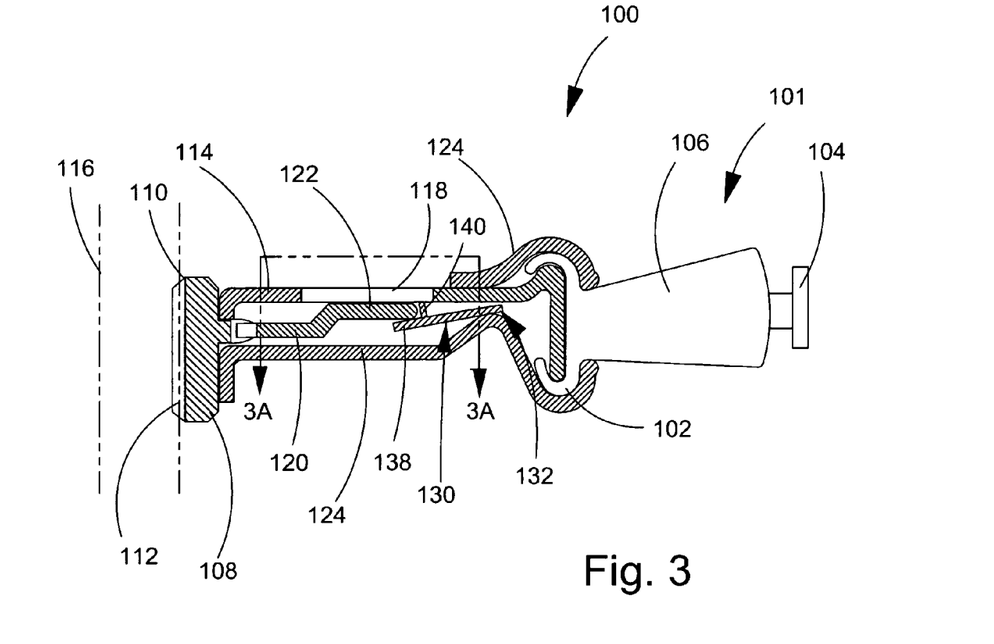
FIG. 3 is a partial cross-sectional view of a present invention stator using stamped metal parts.

FIG. 3 is a partial cross-sectional view of present invention stator 100 using stamped metal parts.

Figure 3A:
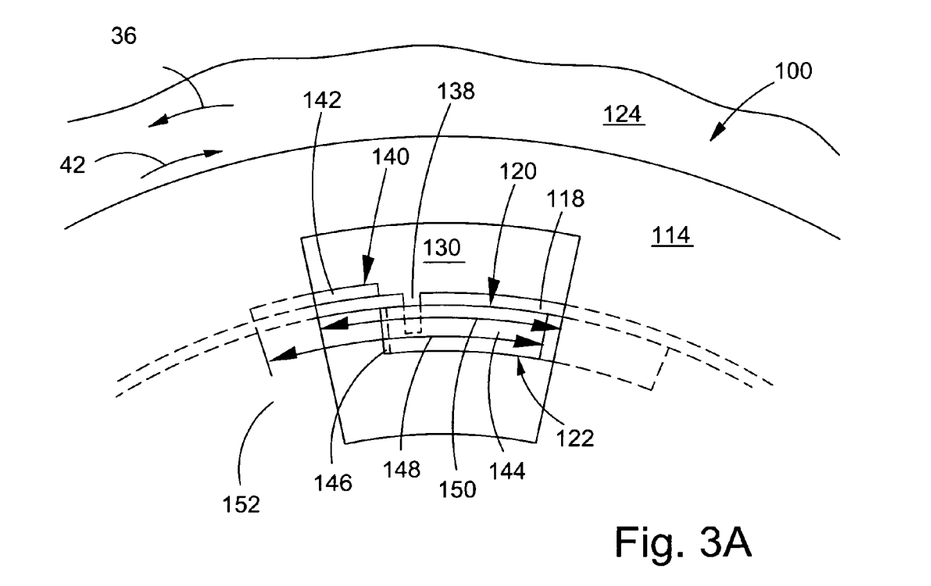
FIG. 3A is a partial plan view of the stator in FIG. 3 along line 3A-3A in FIG. 3.

FIG. 3A is a partial plan view of stator 100 along line 3A-3A in FIG. 3. The following should be viewed in light of FIGS. 3 and 3A. The stator shown in FIGS. 3 and 3A reduces the manufacturing cost and weight of the stator due to a more extensive use of stamped bent parts. Stator rim 101 includes inner stator ring 102, outer stator ring 104, and guide blades 106. The blades are disposed between inner stator ring 102 and outer stator ring 104 and surround stator hub 108. Inner ring 110 carries multi-tooth profile 112 for a stator shaft (not shown). Stator rim 101 and stator hub 108 are cast parts, for example, die-cast aluminum, or plastic injection-molded parts (similar to the rim and hub shown in FIGS. 1A and 2A). However, in some aspects (not shown), the stator rim and hub are sheet metal parts. Therefore, in comparison to the hub and rim shown in FIGS. 1 and 2 (reference designators 10 and 2, respectively), the respective structures of the sheet metal stator rim and stator hub are advantageously diminished.

Inner ring 102 of stator rim 101 is fixedly attached to ratchet disk 114 with respect to the rotation of the hub about axis 116. Disk 114 includes windows 118. Ratchet disk 114 is rotatably interfaced with stator hub 108. Locking disk 120 includes ramps 122, pressed out at the periphery of disk 120, and is fixedly connected to stator hub 108 with respect to the rotation of the hub about axis 116. Annular to toroid stator rim carrier 124 encompasses inner stator ring 102 of stator rim 101. Carrier 124 is fixedly connected to ring 102 with respect to the rotation of the ring about axis 116 and guides stator hub 108. Thus, inner stator ring 102, outer stator ring 104, guide blades 106, disk 114, and carrier 124 rotate together.

Locking disk 120 is spring-loaded by cup spring 130, enabling ramps 122 to engage windows 118. However, it should be understood that any means known in the art can be used to bias disk 120. Cup spring 130 is stressed at its outer circumference 132 and contacts disk carrier 124. Thus, spring 130 applies force to locking disk 120 in the direction of ratchet disk 114. Spring 130 also contacts disk 120, for example, at tabs 138. For spring 130, the area of contact with carrier 124 is greater than the area of contact with disk 120.

Therefore, spring 130 rotates with carrier 124 and rotates independently of disk 120 in freewheel mode. However, in some aspects (not shown), locking disk 120 may also be configured as intrinsically elastic and cup spring 130 can be omitted. Then, locking disk 120 is in direct contact with stator rim carrier 124 and is stressed at its outer circumference by stator rim carrier 124. Tabs 138 extend radially inward toward hub 108 and engage disk 120 at ramps 122. Spring 130 also includes tabs 140 having top surfaces 142.

In freewheel mode (direction 36), as shown in FIGS. 3 and 3A, tabs 138 rotate until the tabs reach the vicinity of or engage wall 146 of ramps 122, restraining further movement of the spring in direction 36. In this position, top surfaces 142 are substantially radially coplanar with top surfaces 144 of ramps 122 and top surfaces 142 and 144 present a composite surface having length 148 longer than length 150 of windows 118. Segments 152 of disk 114, disposed tangentially between the windows, ride upon surfaces 142 and 144, preventing ramp 122 from engaging windows 118. Therefore, disk 114 and disk 120 rotate independently of each other.

In locking mode (direction 42), tabs 138 move away from wall 146 and tabs 140 move into radial alignment with ramps 122. As the tabs and ramp align, length 148 becomes less than length 150. Therefore, ramps 122 enter windows 118, similar to the manner described for the ramps and windows in FIG. 1 (reference numbers 26 and 20 respectively) and disk 114 and disk 120 lock as described for the ratchet and locking disks in FIG. 1 (reference numbers 14 and 24 respectively).

In some aspects, hub 108 and stator rim 101 are solid, for example, in die-cast aluminum and the remaining parts are fabricated from sheet metal profiles or plastic profiles. However, in other aspects, stator hub 108 and/or stator rim 101 also are fabricated from sheet metal profiles or plastic profiles, eliminating or minimizing the need for die-cast or compression-molded parts in stator 100.

Figure 4:
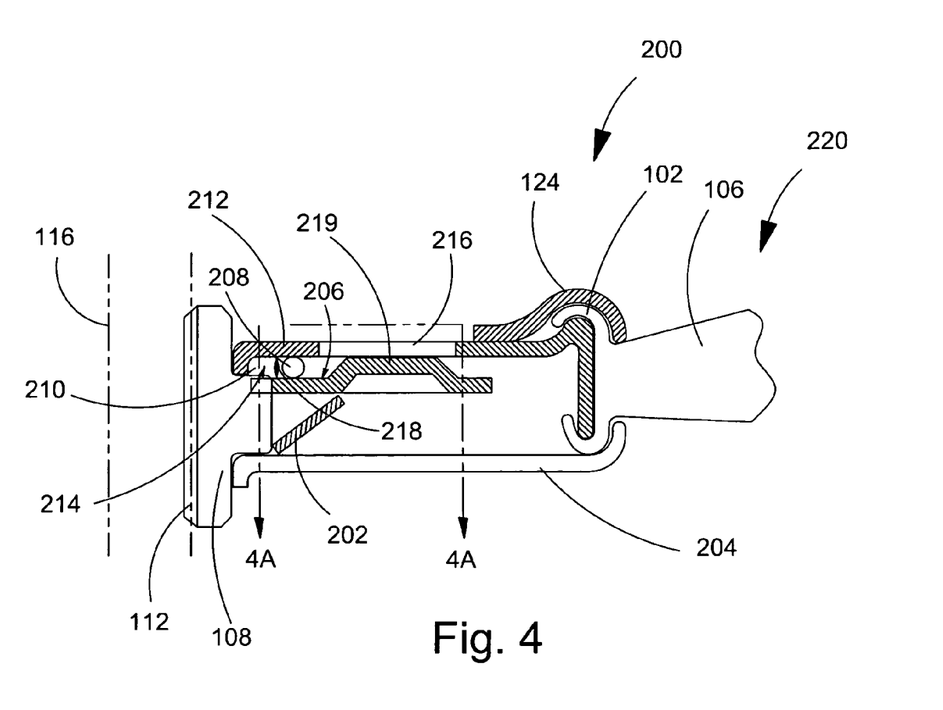
FIG. 4 is a partial cross-sectional view of a present invention stator with a moveable element for separating plates.

FIG. 4 is a partial cross-sectional view of present invention stator 200 with a moveable element for separating plates.

Figure 4A:
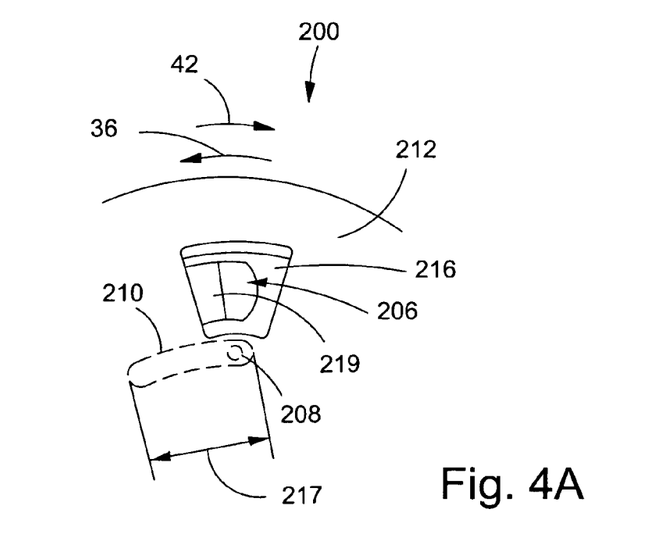
FIG. 4A is a partial plan view of the stator in FIG. 4A along line 4A-4A in FIG. 4.

FIG. 4A is a partial plan view of stator 200 along line 4A-4A in FIG. 4. The following should be viewed in light of FIGS. 4 and 4A. In contrast to the spring configuration in FIG. 3A, cup spring 202 is situated on stator hub 108 or near stator hub 108 between stator rim carrier 204 and locking disk 206. Movable elements 208 are mounted in ramp pockets (also referred to as tracks) 210 disposed between locking disk 206 and ratchet disk 212. The pockets trap elements 208. In some aspects, elements 208 are balls or spheres. In some aspects, ramp pockets 210 are incorporated in the bottom 214 of ratchet disk 212 between each window 216 of ratchet disk 212 and stator hub 108. In some aspects, pockets 210 are formed in disk 206 or are formed in both disk 212 and disk 206. In some aspects, stator rim carrier 204 is configured differently than the rim carrier (reference designator 124) in FIG. 3A.

Pockets 210 are configured along length 217 so that longitudinal height 218, measured between disk 206 and disk 212, increases in direction 36. In the freewheel mode (direction of rotation 36), the rotational energy of stator 200 causes balls 208 to roll along ramp pockets 210 in direction 42. Since disk 212 and rim carrier 204 are axially fixed with respect to stator rim 220, the decrease in height 218 causes elements 208 to push disk 206 axially away from disk 212 as the elements traverse pockets 210. At some point, disk 206 is pushed sufficiently such that ramps 219 do not engage windows 216. In this case, stator rim 220 runs freely on stator hub 108. This freewheel mode enables the stator to experience less wear when freewheeling and generates less noise during operation.

In the locking mode (direction of rotation 42), elements 208 move in direction 36. Since disk 212 and rim carrier 204 are axially fixed with respect to stator rim 220 and height 218 increases as the elements traverse pockets 210, spring 202 pushes disk 206 axially toward disk 212. At a predetermined point, disk 206 is pushed sufficiently such that ramps 219 engage windows 216 and disks 206 and 212 lockingly engage.

In some aspects (not shown), disk 206 is axially fixed, disk 212 is axially displaceable, and spring 202 pushes disk 212 toward disk 206.

Figure 5:
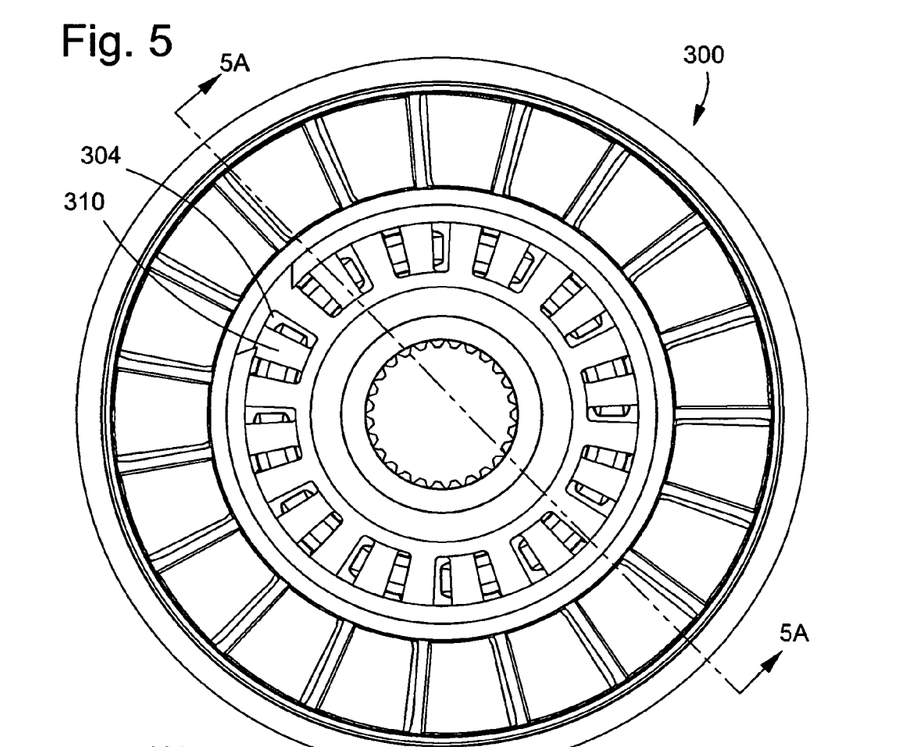
FIG. 5 is a plan view of a present invention stator with an intermediate plate.

FIG. 5 is a plan view of present invention stator 300 with an intermediate plate.

Figure 5A:
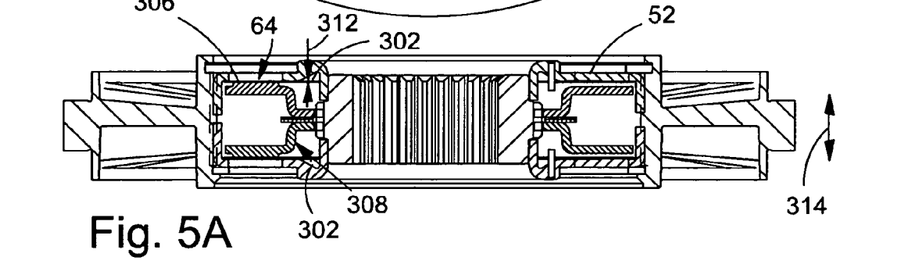
FIG. 5A is a cross-sectional view, along line 5A-5A in FIG. 5, of the stator in FIG. 5 in freewheel mode.

FIG. 5A is a cross-sectional view, along line 5A-5A in FIG. 5, of stator 300 in freewheel mode.

Figure 5B:
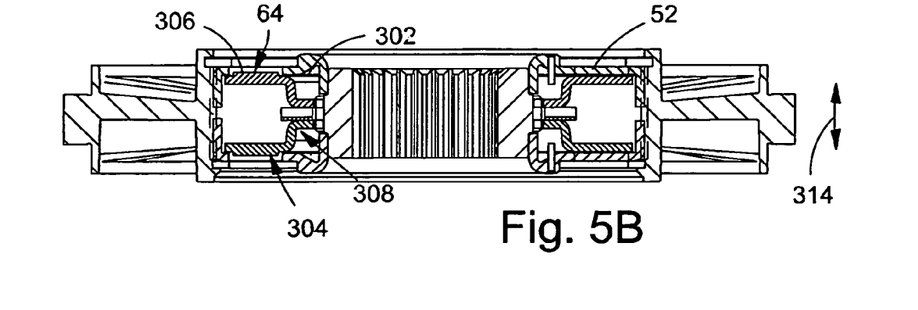
FIG. 5B is a cross-sectional view, along line 5A-5A in FIG. 5, of the stator in FIG. 5 in lock mode.

FIG. 5B is a cross-sectional view, along line 5A-5A in FIG. 5, of stator 300 in lock mode. The following should be viewed in light of FIGS. 5, 5A, and 5B. Stator 300 is substantially the same as the stator of FIG. 2 (reference indicator 50) with the addition of intermediate plates 302 having windows 304. In FIG. 5A, stator 300 is shown in freewheel mode. In this mode, plate 302 stops in a position such that segments 310 of plates 302 come to rest on ramps 306 and prevent the ramps from entering windows 64 and 304. In some aspects, friction between intermediate plate 302 and ramps 306 of locking disks 308 causes plate 302 to stop, however, other means known in the art (not shown), for example, pins in slots and bent tabs, can be used to control the position of plate 302. In some aspects, thickness 312 of plates 302 is less than height of the ramps, reducing the movement of the blocking plate in axial direction 314. This reduction of movement lowers the energy (noise) associated with the movement of disks 52 and plates 308 with respect to each other.

In FIG. 5B, stator 300 is shown in locking mode. In this mode, windows 64 and 304 are aligned and disks 52 and ramps 306 operate as described for the disk and ramps in FIG. 1 (reference designators 14 and 26, respectively).

Figure 6:
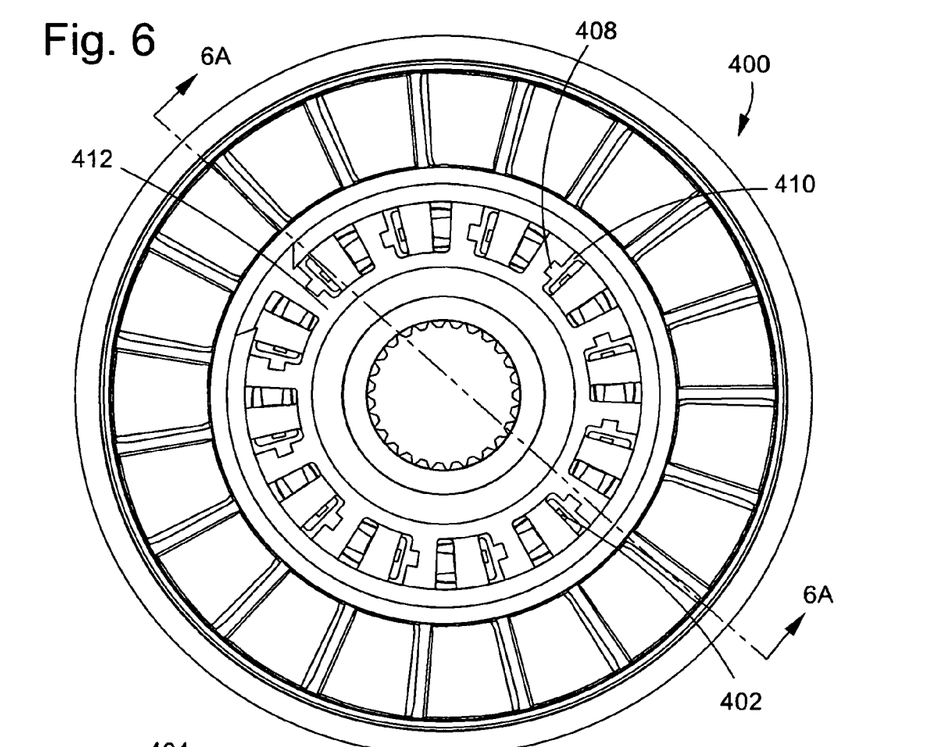
FIG. 6 is a plan view of a present invention stator with an intermediate plate.

FIG. 6 is a plan view of present invention stator 400 with an intermediate plate.

Figure 6A:
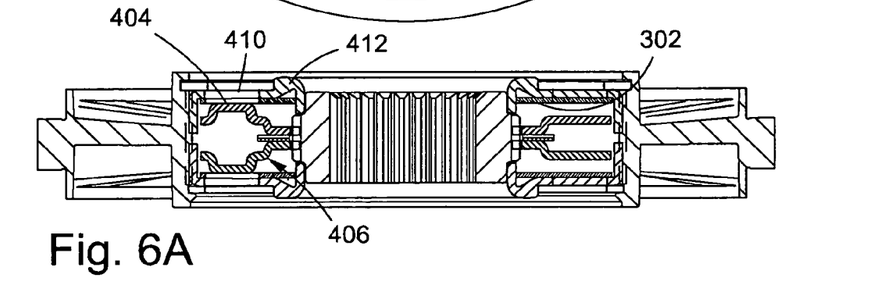
FIG. 6A is a cross-sectional view, along line 6A-6A in FIG. 6, of the stator in FIG. 6 in freewheel mode; and, FIG. 6B is a cross-sectional view, along line 6A-6A in FIG. 6, of the stator in FIG. 6 in lock mode.

FIG. 6A is a cross-sectional view, along line 6A-6A in FIG. 6, of stator 400 in freewheel mode.

Figure 6B:
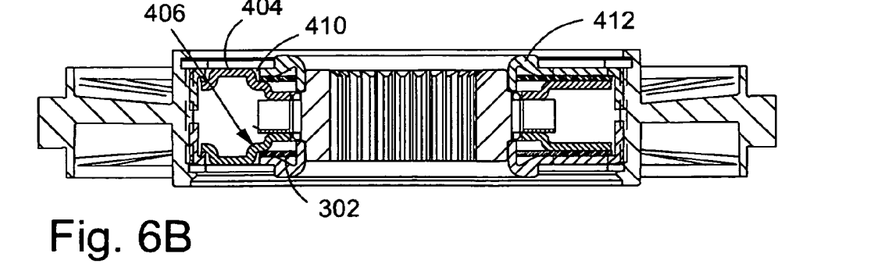

FIG. 6B is a cross-sectional view, along line 6A-6A in FIG. 6, of stator 400 in lock mode. The following should be viewed in light of FIGS. 6, 6A, and 6B. Stator 400 is substantially the same as the stator of FIG. 5 (reference indicator 300) with the addition of tabs 402 on ramps 404 of locking disks 406 and the addition of notches 408 in windows 410 for ratchet disk 412. In freewheel mode (FIG. 6A), tabs 402 contact intermediate plate 302, imparting motion to the plate. Intermediate plate 302 then acts as a hydrodynamic bearing between disk 406 and disk 412. In locking mode, tabs 402 engage notches 408 and enable ramps 404 to slide into windows 410, locking disks 406 and 412, as described for disks 52 and 308 in FIG. 5B. In some aspects (not shown), intermediate plate 302 includes stops to ensure that windows 410 are not covered by plate 302 in lock mode.

The preceding figures and descriptions are directed to a present invention one-clutch in a stator for a torque converter. However, it should be understood that a present invention one-way clutch can be used in any automotive component, including, but not limited to a stator for a torque converter, a torque converter, an actuator mechanism, an accessory drive, and a transmission. Further, in the examples above, a present invention one-way clutch is described with a rotationally fixed plate. However, it should be understood that a present invention clutch can be used without a fixed plate. For example, returning to FIGS. 1 and 1A, hub 10 could be rotatable, then, the free-wheeling and locking modes are with respect to relative movement between plates 14 and 24. For example, assuming the plates rotate in direction 36, the plates free-wheel when plate 14 rotates faster than plate 24, that is, edges 38 run up the ramps as described supra. The plates lock when plate 14 rotates slower than plate 24, such that edges 38 engage the face of the ramps as described supra. That is, plate 14 is rotating in direction 42 relative to said plate 24.

It should be understood that a present invention one-way clutch is not limited to the configuration of plates or disks and openings and protrusions, or ramps, shown in the figures. That is, locations of the openings and protrusions can be reversed. For example, returning to FIGS. 1 through 1B, openings 20 can be formed in plate 24 and ramps 26 can be formed in plate 14. The preceding example is applicable to the other configurations shown above, such as FIG. 3, in which windows 118 can be formed in disk 120 and ramps 122 can be formed in disk 114. That is, one of the plates or disks is formed with one of an opening or a protrusion and the other plate or disk is formed with the other of an opening or protrusion.

The present invention may be manufactured and mounted very economically. It should be understood that many components of a present invention stator may be manufactured from stamped bent parts, replacing previously solid die-cast or compression-molded parts. Also, individual elements (not shown), such as rollers, ratchets, springs, etc. are omitted. Therefore, a present invention stator uses less material and is lighter than prior art stators with a freewheel function.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. An automotive component with a one-way clutch, comprising:
   first and second plates for the one-way clutch; and,
   a spring separately formed from the first and second plates, engaged with one of the first or second plates, and for urging the one of the first or second plates against the other of the first or second plates, wherein the first plate is substantially orthogonal to an axis for said component and rotationally connected to a rotating element of said component, wherein said first plate includes one of a first opening or a first protrusion, wherein when the first plate includes the first opening, the first opening is fully surrounded by the first plate, wherein the second plate is substantially orthogonal to said axis, said second plate including the other of said first opening or said first protrusion, wherein said first opening and said first protrusion are lockingly engageable, wherein when the second plate includes the first opening, the first opening is fully surrounded by the second plate.

2. The automotive component of claim 1 wherein said first plate is rotatable about said axis in a first direction and wherein said first protrusion and said first opening are lockingly engageable when said first plate is rotated faster than said second plate in said first direction.

3. The automotive component of claim 2 wherein said second plate is rotatable about said axis in said first direction.

4. The automotive component of claim 2 wherein said second plate is non-rotatable about said axis.

5. The automotive component of claim 2 wherein said first protrusion and said first opening are slidingly engageable when said first plate is rotating in a second direction, opposite said first direction, relative to said second plate.

6. The automotive component of claim 5 wherein said second plate is non-rotatable about said axis.

7. The clutch of claim 5 further comprising:
   an intermediate plate axially disposed between said first and second plates, wherein in response to said first plate rotating in said second direction relative to said second plate, said intermediate plate and said first protrusion are engageable and said intermediate plate prevents said first protrusion from engaging said first opening.

8. The clutch of claim 7 wherein said intermediate plate further comprises a second opening and wherein said first opening and said second opening are alignable.

9. The clutch of claim 7 wherein said at least one first protrusion further comprises a tab engageable with one of said first or second plates when said intermediate plate is rotated in said second direction.

10. The clutch of claim 7 wherein at least one of said first plate, said second plate, and said intermediate plate is a stamped part.

11. The automotive component of claim 1 wherein:
    the spring is in contact with said second plate; and,
    said second plate is axially displaceable and said spring urges said second plate toward said first plate along said axis.

12. The automotive component of claim 1 wherein said second plate is inherently elastic and is in contact with said first plate.

13. The clutch of claim 1 further comprising:
    a third plate substantially orthogonal to said axis and rotationally connected to said rotating element, said third plate including one of a second opening and a second protrusion; and,
    a fourth plate substantially orthogonal to said axis, said fourth plate including the other of said second opening and said second protrusion, said second opening and said second protrusion lockingly engageable.

14. The clutch of claim 1 further comprising:
    at least one track disposed between said first and second plates; and,
    at least one element disposed in said at least one track and in contact with said first and second plates, wherein said second plate is axially displaceable with respect to said first plate responsive to movement of said element in said track.

15. The clutch of claim 14 wherein said first opening and said first protrusion are engageable responsive to said movement.

16. The clutch of claim 14 wherein said element is moveable in response to rotation of said first plate with respect to said second plate.

17. The clutch of claim 14 wherein said element is a sphere.

18. The clutch of claim 14 wherein said automotive component is selected from the group consisting of a stator for a torque converter, a torque converter, an actuator mechanism, an accessory drive and a transmission.

19. A stator for a torque converter including a one-way clutch, comprising:
    a hub;
    in the one-way clutch, a first plate radially disposed about an axis for said stator and rotationally connected to a rim for said stator, said first plate including one of a first opening or a first protrusion, wherein when the first plate includes the first opening, the first opening is fully surrounded by the first plate; and, in the one-way clutch, a second plate radially disposed about said axis, formed separately from the hub, and rotationally connected to the hub for said stator, said second plate including the other of said first opening or said first protrusion, wherein said first protrusion and said first opening are lockingly engageable when said first plate is rotating in a first direction and wherein said first protrusion and said first opening are slidingly engageable when said first plate is rotating in a second direction, opposite said first direction, wherein when the second plate includes the first opening, the first opening is fully surrounded by the second plate.

20. The clutch of claim 19 further comprising:
an intermediate plate axially disposed between said first and second plates, wherein in response to said first plate rotating in said second direction, said intermediate plate and said first protrusion are engageable and said intermediate plate prevents said first protrusion from engaging said first opening.

21. The clutch of claim 20 wherein at least one of said first plate, said second plate, and said intermediate plate is a stamped part.

22. The stator of claim 19 further comprising:
a biasing element in contact with said second plate; and, wherein said second plate is axially displaceable and said biasing element urges said second plate toward said first plate along said axis.

23. The clutch of claim 19 further comprising:
at least one track disposed between said first and second plates; and,
at least one element disposed in said at least one track and in contact with said first and second plates, wherein said element is moveable in response to rotation of said first plate with respect to said second plate, said second plate is axially displaceable with respect to said first plate responsive to said movement, and said first opening and said first protrusion are engageable responsive to said movement.

24. A method for freewheeling in a stator for a torque converter, comprising:
forming first and second plates separate from a hub for the stator;
disposing a first plate substantially orthogonal to an axis for said stator, said first plate including at least one first opening, the opening fully surrounded by the first plate;
connecting said first plate to a rim for said stator;
disposing a second plate substantially orthogonal to said axis, said second plate including at least one first protrusion;
connecting said second plate to the hub for said stator;
rotating said first plate in a first direction; and,
lockingly engaging said at least one first opening and said at least one first protrusion.

25. The method of claim 24 further comprising:
rotating said first plate in a second direction opposite said first direction; and,
slidingly engaging said at least one first protrusion and said at least one first opening.

* * * * *